(12) United States Patent
Karlsson (10) Patent No.: US 6,535,737 B1
(45) Date of Patent: Mar. 18, 2003

(54) SIGNALLING LINK CAPACITY IN A CELLULAR COMMUNICATIONS SYSTEM (75) Inventor: Bernt Karlsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/291,767

(22) Filed: Apr. 14, 1999

(51) Int. Cl.[7] ................................. H04Q 7/20
(52) U.S. Cl. ................ 455/434; 455/414; 455/466; 455/72
(58) Field of Search ................ 455/433, 435, 455/414, 456, 466, 412, 434, 458, 72

(56) References Cited

U.S. PATENT DOCUMENTS

| 4,464,650 | A | * | 8/1984 | Eastman et al. | 340/347 |
| 5,555,260 | A | * | 9/1996 | Rinnback et al. | 455/33.1 |
| 5,950,135 | A | * | 9/1999 | Cullen | 455/450 |
| 6,151,491 | A | * | 11/2000 | Farris et al. | 455/412 |
| 6,167,122 | A | * | 12/2000 | Titmuss et al. | 455/461 |
| 6,167,253 | A | * | 12/2000 | Farris et al. | 455/412 |

FOREIGN PATENT DOCUMENTS

| EP | 0 836 337 A2 | 4/1998 |
| WO | 81/03560 | 12/1981 |

OTHER PUBLICATIONS

IEEE Global Telecommunications Conference Globecom '91, Phoenix, AZ, Dec. 1991, "Network Aspects for the Third Generation Mobiles", Hans de Boer et al., pp. 1517–1522.

* cited by examiner

Primary Examiner—Thanh Cong Le
Assistant Examiner—Thuan T. Nguyen
(74) Attorney, Agent, or Firm—Jenkens & Gilchrist (57) ABSTRACT A method is disclosed for increasing signaling link capacity between nodes in a digital cellular communications system, wherein the signaling message to be conveyed over the link is compressed. The compressed message received at the other side of the link is then decompressed. As a consequence, the capacity of the signaling links between nodes can be increased up to 100%, and mobile station registration restrictions can be reduced. The method is disclosed for compressing MTP messages, but it can also be used for compressing other signaling messages to improve link capacity.

44 Claims, 4 Drawing Sheets

SIGNALLING LINK CAPACITY IN A CELLULAR COMMUNICATIONS SYSTEM

BACKGROUND OF THE INVENTION

1. Technical Field of the Invention

The present invention relates in general to the mobile communications field and, in particular, to a method and system for improving signalling link capacity in a cellular communications system.

2. Description of Related Art

An important signalling system that has been optimized for use in digital telecommunications networks is the Consulting Committee for International Telegraph and Telephone (CCITT)-recommended Signalling System No. 7 (SS7). The SS7 protocol uses a layered architecture, wherein different layers use services from lower layers. The lower layers can be characterized as the SS7 infrastructure, which includes a Message Transfer Part (MTP), Signalling Connection Control Part (SCCP), and Transaction Capabilities Application Part (TCAP). Higher level protocols, such as the Mobile Application Part (MAP) and ISDN User Part (ISUP), are user applications of the SS7 infrastructure. As such, the MTP conveys signalling messages between the different user parts or application parts in the signalling network, and the SCCP supplements the message-carrying capabilities of the MTP.

In digital cellular communications systems, such as, for example, the Personal Digital Cellular (PDC) System in Japan, the MAP provides mobile-specific signalling capabilities required for the exchange of information between nodes in the PDC network. In this regard, the MAP uses the services of the MTP, SCCP and TCAP. As such, the basis for SS7 signalling in the PDC is a three-level MTP. The level-1 MTP performs signalling data link functions which can be implemented in two similar but oppositely-directed data channels to provide full-duplex signalling. The level-2 MTP performs signalling link functions which are used to transfer variable length signalling messages between two signalling points. The level-3 MTP performs signalling network functions which are used to perform signal unit management and handling tasks.

In digital cellular networks (e.g., in the PDC System), the mobile station registration process involves the transfer of registration information in MTP messages over signalling links between a Mobile Services Switching Center (MSC) and the Home Location Register (HLR). However, in the PDC System, the capacity or throughput of the MTP links between the signalling points (e.g., nodes) is limited (e.g., 4.8 or 48 kbit/sec). Consequently, the number of mobile registrations that can occur per unit of time is also limited. As such, a maximum of 16 signalling links can be installed between an MSC and HLR in a conventional PDC network. However, the MTP signalling links (and associated hardware) between these nodes are relatively costly to install. Therefore, in order to reduce equipment and operating costs, PDC network operators typically limit the number of MTP links between these nodes to 4.

A significant problem that exists because of such limited MTP signalling link capacity in digital cellular networks is illustrated by the restart process in a PDC network. For example, when a restart procedure is initiated in a particular MSC, the MTP signalling links between the MSC and HLR can become overloaded, although the nodes themselves are only loaded to about 30% of their capacity. This signalling link overloading can last anywhere between 10 to 50 minutes depending on the size of the particular network involved. The conventional solution to this link overload problem is to restrict the number of mobile stations that can access the network during a particular period of time. This solution provides a form of load protection for these links, because the links would otherwise be blocked due to congestion and treated by the network as "out of service".

However, a significant problem still remains because in return for a network operator providing such load protection for a signalling link, the throughput of the link may be reduced to about 50% of its theoretical maximum capacity. Nevertheless, as described in detail below, the present invention successfully resolves these and other related problems.

SUMMARY OF THE INVENTION

In accordance with a preferred embodiment of the present invention, a method is provided for increasing MTP signalling link capacity between nodes in a digital cellular communications system, wherein the MTP message to be conveyed over the link is compressed. The compressed MTP message received at the other side of the link is then decompressed. Depending upon the amount of compression used per message, the capacity or throughput of the link can be increased significantly. The present method can also be used for compressing other signalling messages to improve link capacity.

An important technical advantage of the present invention is that the capacity of the signalling links between nodes in a digital cellular communications system can be increased up to 100% of their maximum capacity.

Another important technical advantage of the present invention is that a digital cellular network operator can reduce the duration of a signalling link overload that occurs after restarting an MSC.

Still another important technical advantage of the present invention is that the capacity of nodes and signalling links in a digital cellular communications system will be optimized and their throughput will be maximized.

Yet another important technical advantage of the present invention is that mobile station registration restrictions can be minimized in a digital cellular communications system.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4B of the drawings, like numerals being used for like and corresponding parts of the various drawings.

Essentially, a method is provided for increasing MTP signalling link capacity between nodes in a digital cellular communications system, wherein the MTP message to be conveyed over the link is compressed. The compressed MTP message received at the other side of the link is then decompressed. Depending upon the amount of compression used, the throughput or capacity of the link can be increased up to 100% of its maximum capacity. The present method can also be used for compressing other signalling messages to improve link capacity.

Figure 1:
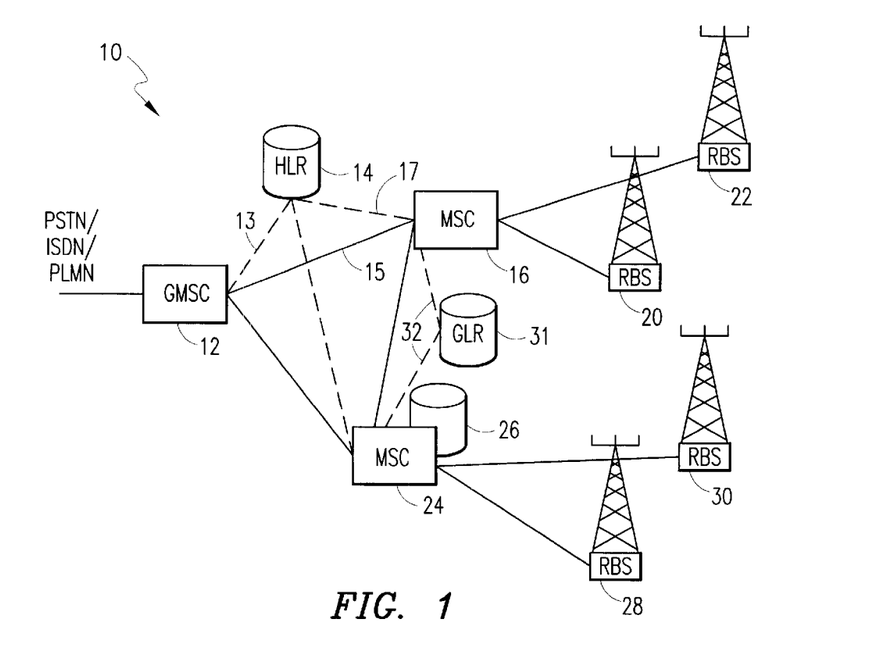
FIG. 1 is a block diagram of a mobile communications system which can be used to implement a preferred embodiment of the present invention.

Specifically, FIG. 1 is a block diagram of a mobile communications system 10, which can be used to implement a preferred embodiment of the present invention. The exemplary system 10 shown can be used, for example, in the PDC System. However, the invention is not intended to be limited to a specific communications system and can be implemented in any communications system where there is an advantage to be realized in improving signalling link capacity in and/or between nodes.

For this exemplary embodiment, system 10 includes a Gateway MSC (GMSC) 12 which connects the mobile network with other fixed or mobile networks. The GMSC 12 is connected by one or more signalling links (e.g., 13) to an HLR 14. The GMSC can interrogate the HLR via the signalling link 13 to obtain current location information about mobile subscribers. The GMSC 12 is also connected to one or more MSCs 16, 24 via respective speech and signalling links (e.g., 15). In this embodiment, a Gateway Location Register (GLR) 31 is preferably collocated with the HLR 14 (e.g., using the same hardware), but these components can also be implemented as separate units. The inter-network visitors' information resides in the GLR 31 for as long as those visitors remain in the network. All MSCs in the network retrieve subscriber data for the inter-network visitors from the GLR 31, for local storage in the MSC involved. Each MSC includes a subscriber database 18, 26 which stores subscriber data for all mobile terminals registered in the MSC involved. As such, the subscriber data will be retrieved (using a location registration process) from the HLR if the mobile terminal belongs to the local network, and from the GLR if the mobile terminal belongs to another network. If subscriber data does not yet exist in the GLR for a particular inter-network visitor (e.g., first-time visitor), the GLR retrieves the data from the visitor's home network's HLR, and distributes these data to the MSC(s). In accordance with the present invention, compression of the signalling messages can be used for both the HLR and GLR.

In any event, the MSCs function for switching calls and controlling mobile registrations and handovers. Also, the MSCs setup and release calls to/from mobile stations via cells defined by the Radio Base Stations (RBSs) 20, 22, 28, 30. The HLR 14 and GLR 31 are connected to the MSCs 16, 24 by respective signalling links (e.g., 17 and 32).

Figure 2:
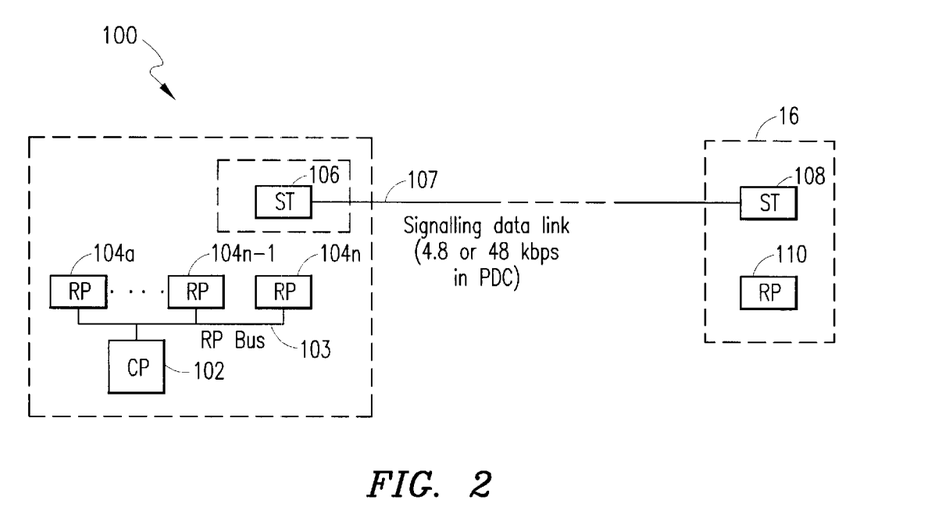
FIG. 2 is a block diagram of an exemplary signalling system which can be used to implement the preferred embodiment of the present invention.

FIG. 2 is a block diagram of an exemplary signalling system 100 that can be used to implement the preferred embodiment of the present invention. For example, in a PDC System, the signalling system 100 can be located in one or more of the nodes (e.g., in the HLR 14 and/or the MSCs 16, 24, etc.). The primary function of the signalling system 100 is to convey signalling messages (e.g., MTP messages) over a signalling data link 107 between nodes (e.g., between an HLR and an MSC).

The exemplary signalling system 100 shown (e.g., HLR 14) includes a Central Processor (CP) 102 coupled to a plurality of Regional Processors (RPs) 104a–n by an RP bus 103. An RP (e.g., 104n) is connected by a data line to a Signalling Terminal (ST) 106. Essentially, the CP 102 performs complex program control and data-handling tasks, while the RPs 104a–n perform routine, simple and/or highly repetitive tasks and some protocol handling. Notably, in accordance with the preferred embodiment of the present invention, the ST 106 can be embodied in software and/or hardware in a node (e.g., HLR 14) and is used to compress MTP messages and convey them as such over the signalling data link 107 to another node (e.g., MSC 16). For illustrative purposes, a second ST 108 is shown in the second node (MSC 16) for receiving and decompressing the compressed MTP messages. Also, the arrangement shown in FIG. 2 can be reversed to convey signalling messages in the opposite direction (e.g., from the MSC 16 to the HLR 14). A processor (not explicitly shown) in each of the STs can be used to perform the signalling message compression and/or decompression software tasks. The original (compressed and then decompressed) MTP messages are then conveyed to an RP 110 for further handling. Again, note that the above-described process of compressing and decompressing MTP messages can be implemented in either direction over a signalling link. In other words, depending upon the signalling direction desired, the MTP message compression can be performed in a sending node (e.g., in an HLR or MSC), and the MTP message decompression is then performed in the receiving node of that particular pair.

Figure 3A:
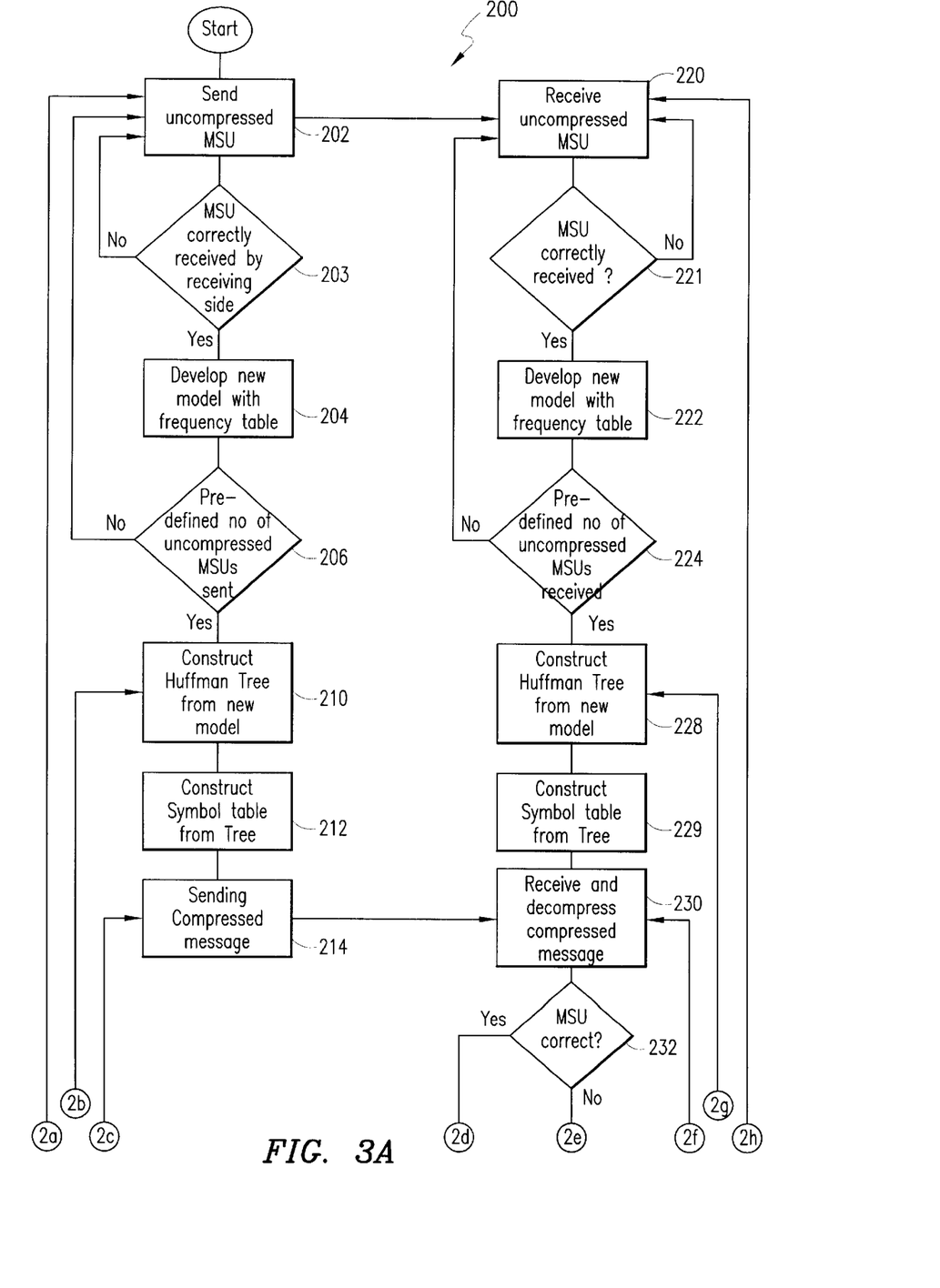
FIGS. 3A and 3B are related flow diagrams of an exemplary method that can be used to compress and decompress signalling messages in order to increase signalling link capacity or throughput, in accordance with the preferred embodiment of the present invention.
Figure 3B:
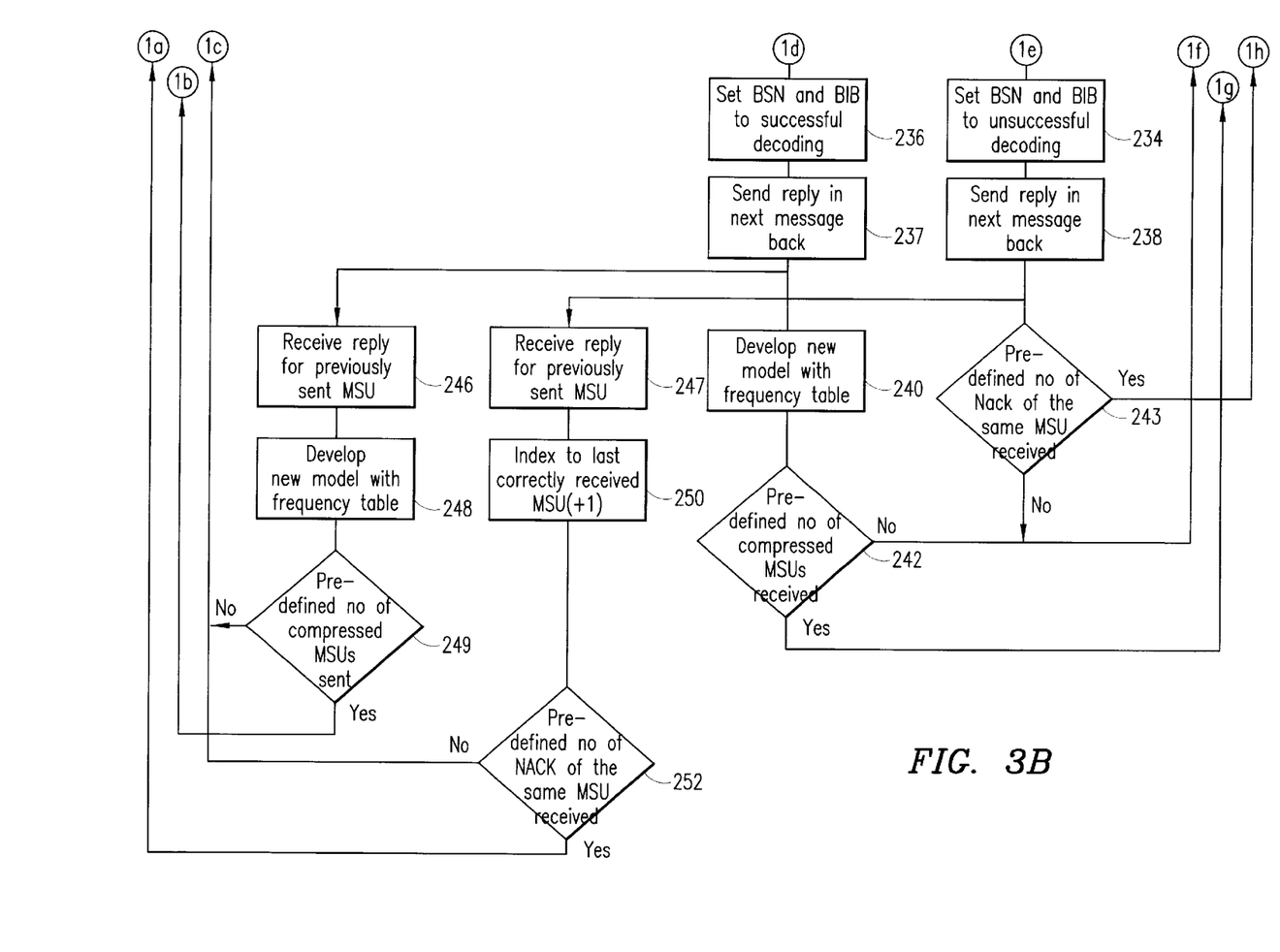

FIGS. 3A and 3B are related flow diagrams of an exemplary method 200 that can be used, for example, with an ST to compress and decompress signalling messages in order to increase signalling link capacity or throughput, in accordance with the preferred embodiment of the present invention. For this illustrative embodiment, MTP messages are compressed and sent over a signalling data link connected between an ST (106) in an HLR (14) and an ST (108) in an MSC (16). The compressed messages are decompressed and reconstructed by the ST (108) on the receiving node side. Again, it should be stressed that the present invention can also be applied advantageously to the compression/decompression of signalling messages other than MTP messages, in order to increase link capacity or throughput.

Figure 4A:
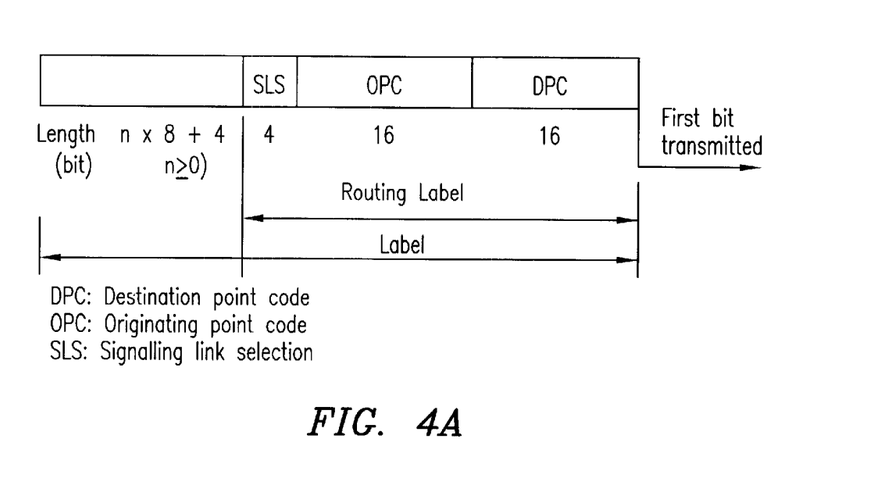
FIGS. 4A and 4B are related diagrams of a signalling message format that can be used to implement the preferred embodiment of the present invention.
Figure 4B:
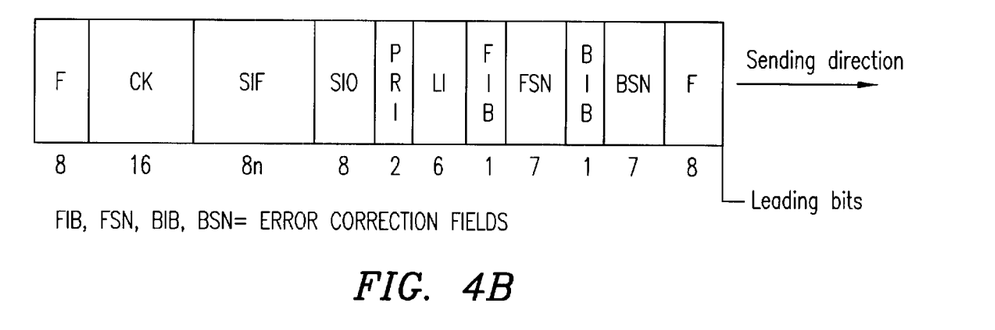

FIGS. 4A and 4B are related diagrams of a signalling message format that can be used to implement the preferred embodiment of the present invention. For this embodiment, the signalling message format used is for an MTP message, but the present invention is not intended to be so limited and can cover any type of signalling message or Application Part (e.g., MAP, HAP, TCAP, INAP, etc.) message that can be compressed and/or decompressed and used therefore to improve signalling link throughput or capacity. A conventional MTP message label format for a PDC System is shown in FIG. 4A, and a conventional Message Signal Unit (MSU) format for such an MTP message is shown in FIG. 4B. The label is part of the Signalling Information Field (SIF) of the MTP message in FIG. 4B.

Generally, referring to FIGS. 4A and 4B for illustrative purposes, it can be assumed for the preferred embodiment, that all signalling message compression and decompression functions are performed in STs. The sending ST compresses the MTP message just prior to "bit stuffing" of the message. The receiving ST decompresses the compressed MTP message just after removing the "bit stuffing" bits. Note that the process of "bit stuffing" an MTP message in this embodiment comprises the addition of an extra "0" after five consecutive "1"s in the message. The extra "0"s are then deleted in the receiving ST. In the PDC and other similar systems, the use of such "bit stuffing" of MTP messages is to ensure that the synchronization flag (F) "01111110" will not be imitated anywhere else in the MTP message.

Preferably, for this embodiment, the Length Indicator (LI) field and error correction field are not compressed or decompressed. The error correction field includes a Forward Indicator Bit (FIB), Forward Sequence Number (FSN), Backward Indicator Bit (BIB), and Backward Sequence Number (BSN). The LI is used to distinguish between the types of signal units in the MTP message. As such, the conventional MTP message includes a Fill-in Signal Unit (FISU), a Link Status Signal Unit (LSSU), and an MSU. For this embodiment, only the MSU is compressed or decompressed.

Essentially, returning to FIGS. 3A and 3B, the exemplary method can be characterized as follows. First, a plurality of uncompressed MTP messages are sent from the sending ST. During this period, each of the sending and receiving STs develops a message model (e.g., frequency usage table), constructs a conventional Huffman code tree from the message model, and uses the Huffman tree to construct a symbol table. After a predetermined number of such uncompressed messages have been sent, the sending and receiving STs switch to a compressed mode of operation. Also, during the above-described period, the sending and receiving STs continue to construct new message models, Huffman trees and symbol tables. After a predetermined number of compressed messages are sent, both the sending and receiving STs switch to use of their respective new message models. This procedure is continued as long as there are MTP messages to send.

Specifically, referring to step 202 of the exemplary method shown in FIGS. 3A and 3B and also to FIGS. 4A and 4B, the ST (e.g., 106) in the sending node (e.g., the HLR 14) starts to send a number of uncompressed MSUs to the ST (e.g., 108) in the receiving node (e.g., the MSC 16). At step 203, the sending ST (e.g., 106) determines whether a sent MSU has been correctly received by the receiving ST (e.g., 108). If not, the sending ST sends another uncompressed MSU (step 202). Otherwise, if a sent MSU has been correctly received, at step 204, the sending ST develops a new message model for compression preferably by determining the frequency of symbols that occur in a predefined number of messages which are to be conveyed from the sending node to the receiving node. For example, a frequency table can be developed.

At step 206, the sending ST determines if a predefined number of the uncompressed MSUs have been sent to the receiving ST. If not, the method returns to step 202. If so, at step 210, the sending ST constructs a Huffman code tree from the newly developed message model (the new model developed in step 204). The technique used for Huffman coding is well-known. At step 212, the sending ST constructs a symbol table from the Huffman tree. Using this reiterative approach ensures that the symbol table will provide as efficient a message compression (or decompression) as possible even if the contents of the MSUs vary over time. In order for the sending and receiving STs to be able to synchronize the development of the symbol frequencies, at step 214 (after construction of the symbol table), the sending ST starts to send a compressed message (MSU) over the signalling link to the receiving ST.

Returning to step 202 of the exemplary method, and moving to step 220, the receiving ST (e.g., 108) receives the uncompressed MSU from the signalling link 107. At step 221, the receiving ST determines whether an MSU has been correctly received. If not, then the method returns to step 220 to await a received MSU. Otherwise, at step 222, the receiving ST develops a message model (e.g., with a frequency table) from the received uncompressed MSUs. At step 224, the receiving ST determines if a predefined number of uncompressed MSUs have been received. If not, the method returns to step 220. If so, at step 228, the receiving ST constructs a Huffman code tree from the newly developed message model that had been developed in step 222. Again, the technique used for Huffman coding is well-known. At step 229, the receiving ST constructs a symbol table from the Huffman tree. At step 230, the receiving ST starts to decompress the compressed messages received from the signalling link 107 (from step 214).

At step 232, the receiving ST determines whether the received compressed message is being properly decompressed (e.g., able to correctly decode the compressed MSU). If not, at step 234 (FIG. 3B), the receiving ST sets the value of the BSN field of the next MTP message to be sent back to the ST 106 equal to the value of the FSN field for the last correctly-decoded MSU, and the value of the BIB field in that message is set equal to the inverse value of the FIB field of the last correctly received MSU. Otherwise, at step 236 (FIG. 3B), the receiving ST sets the value of the BSN field of the next MTP message to be sent back to the ST 106 equal to the value of the FSN field of the last MSU, and sets the value of the BIB field in that MTP message to the value of the FIB field of the last MSU. As such, these values can be set in the MSU, LSSU or FISU of that next reply MTP message from the receiving ST to the sending ST. At step 237 or step 238, the receiving ST sends a reply message to the sending ST. The reply message includes the BSN and BIB fields set either for successful decoding (step 236) or unsuccessful decoding (step 234).

At step 240, the receiving ST develops a new message model (e.g., with the frequency table). At step 242, the receiving ST determines if a predefined number of compressed MSUs have been received and properly decoded. If not, the method returns to step 230 (FIG. 3A). Otherwise, the method returns to step 228 (FIG. 3A), wherein the receiving ST constructs a Huffman tree from the newly developed message model (from step 240). At step 243, the receiving ST determines if a predefined number of negative acknowledgment (NACK) messages for the same MSU have been received. If not, the method returns to step 230 in FIG. 3A. Otherwise, the method returns to step 220 in FIG. 3A.

Returning to step 246 or step 247, the sending ST receives from the signalling link 107 a respective (successful or unsuccessful) reply message for the previous MSU sent from the receiving ST (from step 237 or 238). At step 248, the sending ST develops a new message model (e.g., with the frequency table). At step 249, the sending ST determines if a predefined number of compressed MSUs have been sent to the receiving ST. If not, the method returns to step 214 (FIG. 3A), wherein the sending ST sends another compressed message. Otherwise, the method returns to step 210 (FIG. 3A), wherein the sending ST constructs a Huffman tree from the newly developed message model (from step 248).

Returning to step 250, the sending ST indexes to the last correctly decoded MSU+1 (i.e., the first incorrectly decoded MSU). At step 252, the sending ST determines if a predefined number of negative acknowledgment (NACK) messages for the same MSU have been received. If not, then the method returns to step 214 in FIG. 3A. Otherwise, the method can be started again at step 202 in FIG. 3A.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for increasing signaling link throughput between nodes in a mobile communications system, comprising the steps of:
    a first terminal, associated with a first node, compressing a signaling message;
    said first terminal sending said compressed signaling message over said signaling link to a second node;
    a second terminal, associated with said second node, decompressing a received compressed signaling message;
    said second terminal determining whether said compressed signaling message was properly decompressed; and
    in response to the step of determining by said second terminal that said compressed signaling message was properly decompressed, developing a compression model.

2. The method of claim 1, wherein said signaling message comprises a message transfer part.

3. The method of claim 1, wherein said signaling link comprises a message transfer part signaling link.

4. The method of claim 1, wherein said signaling message comprises a Message Signal Unit.

5. The method of claim 1, wherein said signaling message comprises a Link Status Signal Unit.

6. The method of claim 1, wherein said signaling message comprises a Fill-In Signal Unit.

7. The method of claim 1, wherein said signaling message comprises a Signaling Connection Control Part.

8. The method of claim 1, wherein said signaling message comprises a Transaction Capabilities Application Part.

9. The method of claim 1, wherein said first node comprises a Home Location Register, and said second node comprises a Mobile Services Switching Center.

10. The method of claim 1, wherein said mobile communications system comprises a PDC system.

11. The method of claim 1, wherein said first node comprises a Gateway Location Register, and said second node comprises a Mobile Services Switching Center.

12. The method of claim 1, wherein said first node comprises a first Mobile Services Switching Center, and said second node comprises a second Mobile Services Switching Center.

13. The method of claim 1, wherein said mobile communications system comprises a GSM.

14. The method of claim 13, wherein said first node comprises a Visitors Location Register.

15. The method of claim 1, wherein said mobile communications system comprises a Digital-Advanced Mobile Phone System.

16. The method of claim 1, wherein said first terminal comprises a signaling terminal.

17. The method of claim 1, wherein said second terminal comprises a signaling terminal.

18. The method of claim 1, wherein said first node comprises a central processor coupled to a plurality of regional processors and wherein one of said plurality of regional processors is connected to a first signaling terminal.

19. A method for increasing signaling link throughput between nodes in a mobile communications system, comprising the steps of:
    a first terminal, associated with a first node, developing a first compression model from a signaling message;
    said first terminal constructing a Huffman code tree from said model;
    said first terminal constructing a coded symbol table from said Huffman tree;
    said first terminal sending a plurality of coded symbols from said coded symbol table over said signaling link to a second terminal;
    said second terminal, associated with a second node, decoding a received plurality of coded symbols;
    said second terminal determining whether said compressed plurality of coded symbols were properly decoded; and
    in response to a determination by said second terminal that said compressed plurality of coded symbols were properly decoded, developing a second compression model.

20. The method of claim 19, wherein said signaling message comprises a message transfer part.

21. The method of claim 19, wherein said signaling link comprises a message transfer part signaling link.

22. The method of claim 19, wherein said signaling message comprises a Message Signal Unit.

23. The method of claim 19, wherein said signaling message comprises a Link Status Signal Unit.

24. The method of claim 19, wherein said signaling message comprises a Fill-In Signal Unit.

25. The method of claim 19, wherein said signaling message comprises a Signaling Connection Control Part.

26. The method of claim 19, wherein said signaling message comprises a Transaction Capabilities Application Part.

27. The method of claim 19, wherein said first terminal is associated with a Home Location Register, and said second terminal is associated with a Mobile Services Switching Center.

28. The method of claim 19, wherein said mobile communications system comprises a PDC system.

29. The method of claim 19, wherein said first terminal comprises a signaling terminal.

30. The method of claim 19, wherein said second terminal comprises a signaling terminal.

31. The method of claim 19, wherein said first node comprises a central processor coupled to a plurality of regional processors and wherein one of said plurality of regional processors is connected to a first signaling terminal.

32. A system for increasing signaling link throughput between nodes in a mobile communications system, comprising:
    a first terminal coupled to a first node, said first terminal operable to compress a signaling message and send said compressed signaling message over said signaling link to a second node; and
    a second terminal coupled to said second node, said second terminal operable to receive said compressed signaling message from said signaling link and decompress said compressed signaling message and to determine whether said compressed signaling message was properly decompressed, wherein each of the first and the second terminal is operable to develop a compression model in response to a determination that said compressed signaling message was properly decompressed by said second terminal.

33. The system of claim 32, wherein said signaling message comprises a message transfer part.

34. The system of claim 32, wherein said signaling link comprises a message transfer part signaling link.

35. The system of claim 32, wherein said signaling message comprises a Message Signal Unit.

36. The system of claim 32, wherein said signaling message comprises a Link Status Signal Unit.

37. The system of claim 32, wherein said signaling message comprises a Fill-In Signal Unit.

38. The system of claim 32, wherein said signaling message comprises a Signaling Connection Control Part.

39. The system of claim 32, wherein said signaling message comprises a Transaction Capabilities Application Part.

40. The system of claim 32, wherein said first node comprises a Home Location Register, and said second node comprises a Mobile Services Switching Center.

41. The system of claim 32, wherein said mobile communications system comprises a PDC system.

42. The system of claim 32, wherein said first terminal comprises a signaling terminal.

43. The system of claim 32, wherein said second terminal comprises a signaling terminal.

44. The system of claim 32, wherein said first node comprises a central processor coupled to a plurality of regional processors and wherein one of said plurality of regional processors is connected to a first signaling terminal.

* * * * *

UNITED STATES PATENT AND TRADEMARK OFFICE
CERTIFICATE OF CORRECTION

PATENT NO.    : 6,535,737 B1
DATED         : March 18, 2003
INVENTOR(S)   : Bernt Karlsson It is certified that error appears in the above-identified patent and that said Letters Patent is hereby corrected as shown below:

Title page,
Item [56], OTHER PUBLICATIONS, insert -- ISE PCT/SE 00/00693; date completed 25 August 2000 --

Drawings,
Illustrative Fig and Figure 1, insert -- database 18 --

Column 1,
Line 1, replace "SIGNALLING" with -- SIGNALING --
Lines 9, 12, 24, 25, 30, 34, 35, 37, 38, 41, 46, 50, 53, 55, 61, 64 and 66, replace "signalling" with -- signaling --
Lines 15 and 19, replace "Signalling" with -- Signaling --
Line 40, (First occurrence of signalling), replace "signalling" with -- signaling --
Line 40, (Second occurrence of signalling), replace "signalling" with -- signaling --

Column 2,
Lines 10, 18-19, 26, 29, 37, 53 and 61, replace "signalling" with -- signaling --
Line 58 (First occurrence of signalling), replace "signalling" with -- signaling --
Line 58 (Second occurrence of signalling), replace "signalling" with -- signaling --

Column 3,
Lines 4, 11, 20, 25, 27, 30, 48-49, 55, 57, 60, 62, 63, 64 and 66, replace "signalling" with -- signaling --

Column 4,
Lines 3, 10, 15, 18, 31, 32, 35, 41, 43, 46, 48, 51, 55 and 59, replace "signalling" with -- signaling --
Line 24, (First occurrence of signalling), replace "signalling" with -- signaling --
Lines 24-25, (Second occurrence of signalling), replace "signalling" with -- signaling --

Column 5,
Lines 62 and 65, replace "signalling" with -- signaling --

UNITED STATES PATENT AND TRADEMARK OFFICE
CERTIFICATE OF CORRECTION

PATENT NO. : 6,535,737 B1
DATED : March 18, 2003
INVENTOR(S) : Bernt Karlsson It is certified that error appears in the above-identified patent and that said Letters Patent is hereby corrected as shown below:

<u>Column 6,</u>
Lines 13 and 47, replace "signalling" with -- signaling --

Signed and Sealed this

Second Day of September, 2003

JAMES E. ROGAN
*Director of the United States Patent and Trademark Office*